July 20, 1926.
J. WAVRA
DIRECTION INDICATOR
Filed Feb. 14, 1925
1,593,050
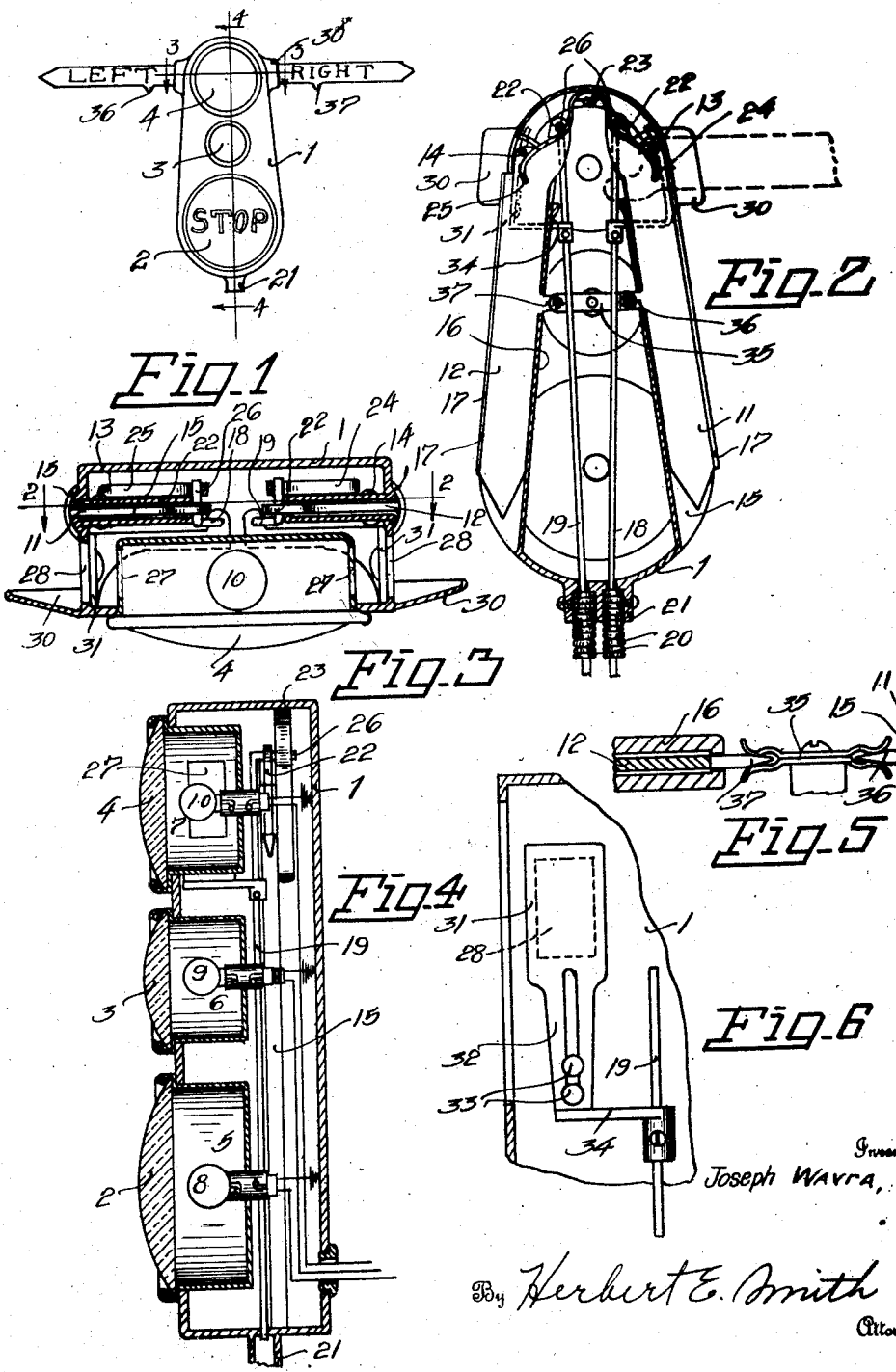
Inventor
Joseph Wavra,
By Herbert E. Smith
Attorney Patented July 20, 1926.

1,593,050

UNITED STATES PATENT OFFICE.

JOSEPH WAVRA, OF SPOKANE, WASHINGTON.

DIRECTION INDICATOR.

Application filed February 14, 1925. Serial No. 9,305.

My present invention relates to improvements in vehicle signals for use on automotive vehicles and particularly at the rear of automobiles, as on the rear fender or on the tire carrier at the rear of the vehicle.

The invention involves the use of a plurality of illuminated signals, as a tail lamp, a stop indicator and a caution light (of green or blue color) together with a pair of manually operated semaphore signals for indicating the direction of travel of an automobile. Means are provided for automatically illuminating the semaphores, selectively, when a semaphore is moved to indicating position and for making an electric lighting circuit which circuit is automatically broken when the semaphore is returned to normal position.

The invention consists in certain novel combinations and arrangements of parts involving the structures above outlined, as will hereinafter be more fully set forth and claimed.

In the accompanying drawings I have illustrated one complete example of the physical embodiment of my invention wherein the parts are combined and arranged in accordance with the best mode I have thus far devised for the practical application of the principles of my invention.

Figure 1 is a view in elevation showing an embodiment of my invention.

Figure 2 is an enlarged vertical sectional view of the housing and disclosing the semaphores or blades and connections, the section being indicated at line 2—2 of Figure 3.

Figure 3 is a transverse horizontal sectional view at line 3—3 of Figure 1.

Figure 4 is a vertical transverse sectional view, enlarged, at line 4—4 of Figure 1.

Figure 5 is a detail view of the circuit breaker for the caution light which latter is extinguished when either of the semaphore signals are being used, that is swung to indicating position.

Figure 6 is a fragmentary detail elevation of the shutter mechanism for the windows of the casing.

In carrying out my invention I utilize a box or casing 1 preferably of metal, which is attached, as before indicated to the extra tire-carrier, at the rear of a fender, or at some other convenient location at the rear of the automobile.

The casing is provided with three lenses as 2, 3 and 4 each provided with a lamp chamber as 5, 6, 7, for the respective lamps 8, 9 and 10 that are utilized to illuminate the several signals or signs. The lamp 10 for the tail lights 4 is connected with the regular or usual car circuit by means of suitable wires or conductors, and the lamp 8 for the stop sign is included in a normally open circuit that is closed by action of the brake pedal, in usual manner. The caution light 3 which may be of green or blue color, is normally illuminated, but its normally closed circuit is broken when either of the direction indicating signals is used.

The two semaphores or blades 11 and 12 are pivoted as at 13 and 14 to swing upwardly to horizontal position at the right and left hand sides of the housing. In normal retracted position these blades hang in housings 15 and 16 formed within the casing 1 and provided with open sides or slots which, when the blades are in normal position, are closed by curved plates 17 located at the outer edges of the blades or semaphores. These plates form guards or shields against ingress of dust, rain, or snow to the interior of the housings for the semaphores.

The blades or semaphores are manually operated, selectively, from the front of the automobile by the driver, through the means of flexible pull cords or cables as 18 and 19 enclosed within tubular housings 20 that are fastened in the boss 21 at the lower end of the casing. The cables or wires are connected at 22 to the pivoted semaphores at their upper ends and it will be apparent that a pull on one of the cables will swing the semaphore to horizontal position as indicated in dotted lines in Figure 2. When the semaphore is to be retracted the pull on the cable or wire is released and the semaphore or blade is automatically returned to normal position within its housing by spring action. For this purpose I utilize a U-shaped flat, double spring secured in the top of the casing at 23 and the two ends 24 and 25 of this spring plate are fashioned with compound curves as shown in Figure 2. Each semaphore has a pin 26 passing therethrough and fixed therein, the ends of the pin projecting laterally from the upper end of the blade and contacting with the outer face of one of the spring arms at all times. Thus when the semaphore or blade is swung to horizontal position, its pin rides down the face of the spring arm forcing the arm to bend inwardly and holding it under tension. When the pressure is released the spring arm snaps outwardly and by its pressure on the pin causes the semaphore to swing to retracted position.

When the semaphore is swung to horizontal or indicating position it is illuminated in that position by the upper lamp 10, the light rays from which pass through one of the openings 27 arranged at the opposite sides of the lamp housing 7, and also through an uncovered opening 28, one of which is arranged in the casing at each side thereof and in front of the semaphore.

A reflector plate 30 extends laterally from each side of the casing, with its rear reflecting face at the proper angle to receive light rays from the lamp 10 and direct them outwardly to the horizontal semaphore for its illumination at night, the lighting circuit of course being cut out during the day time and when not needed for illumination purposes.

The windows 28 are normally closed by a slide shutter 31, as best seen in Figure 6, one of these shutters being employed for each window. The shutter is located at the inner side of the side walls of the casing and is connected to slide thereon by means of a slotted arm 32 and pins 33, and an angular fastening arm 34 extends inwardly toward the center of the casing for attachment to the pull wires or cables. When the semaphore is swung to indicating position the shutter controlled by the cable that actuates the semaphore is opened, the other shutter remaining in closed position to prevent radiation of light through its window.

When the direction indicators are being operated the caution lamp 9 is preferably extinguished and for this purpose I utilize a circuit breaker as seen in Figure 5 for the normally closed caution lamp circuit. A double switch member 35 is located in line between the two semaphores and properly supported and each semaphore has a contact blade as 36 and 37 for normal engagement with the forked ends of the switch member. These circuit breakers are in the lighting circuit for the lamp and it will be apparent that when a semaphore is swung to horizontal position the circuit is automatically broken and is again closed when the semaphore returns to normal position.

Having thus fully described my invention what I claim as new and desire to secure by Letters Patent is—

The combination with a casing having a U-shaped spring of a pair of opposed pivoted blades, lateral housings in the casing for said blades, pull cables attached to said blades, and projecting members on said blades for frictional engagement with said spring whereby the blade is returned to normal position after the pull is released from a cable.

In testimony whereof I affix my signature.

JOSEPH WAVRA.